(12) United States Patent
Natrop

(10) Patent No.: US 6,588,970 B1
(45) Date of Patent: Jul. 8, 2003

(54) JOINTING UNIT FOR BONDING SEAMS, PARTICULARLY VIBRATION WELDS

(75) Inventor: Joachim Natrop, Dettingen/ Erms (DE)

(73) Assignee: bielomatik Leuze GmbH + Co. (DE)

( * ) Notice: Subject to any disclaimer, the term of this patent is extended or adjusted under 35 U.S.C. 154(b) by 155 days.

(21) Appl. No.: 09/680,056

(22) Filed: Oct. 4, 2000

(30) Foreign Application Priority Data

Oct. 8, 1999 (DE) .......................................... 199 48 515

(51) Int. Cl.⁷ ................................................ F16B 11/00
(52) U.S. Cl. ........................ 403/270; 403/282; 264/248; 156/73.5
(58) Field of Search ............................ 403/270, 11, 265, 403/282, 284; 264/248; 156/73.5, 308.2; 277/419

(56) References Cited

U.S. PATENT DOCUMENTS

| 4,379,600 A | * | 4/1983 | Muëller .................... 308/187.1 |
| 4,919,987 A | | 4/1990 | Manner |
| 5,269,917 A | * | 12/1993 | Stankowski ................. 210/232 |
| 5,670,108 A | * | 9/1997 | Kern et al. .................. 264/248 |

FOREIGN PATENT DOCUMENTS

| BE | 666748 | | 1/1966 | |
| DE | 17 79 103 | | 8/1971 | |
| DE | 37 00 981 | | 7/1988 | |
| DE | 38 35 640 | | 4/1990 | |
| DE | 42 44 017 | * | 6/1994 | ............ F28F/19/04 |
| DE | 197 19 363 | | 11/1997 | |
| EP | 687 547 | * | 9/1995 | ............ B29C/65/00 |
| EP | 0687547 A2 | | 12/1995 | |
| GB | 2217255 A | | 10/1989 | |
| GB | 2 217 255 | * | 10/1989 | ............ B29C/65/06 |
| GB | 2279035 A | | 12/1994 | |
| JP | 58219019 | | 12/1983 | |
| JP | 8-132529 | * | 5/1996 | ............ B29C/65/06 |
| JP | 10-193460 | * | 7/1998 | ............ B29C/65/06 |

* cited by examiner

Primary Examiner—Lynne H. Browne
Assistant Examiner—Michael P. Ferguson
(74) Attorney, Agent, or Firm—Akerman Senterfitt

(57) ABSTRACT

Two components (2, 3) to be joined to each other by vibration welding form on one or both sides of the bounding seam (10) barrier means (20) including a labyrinth seal. Means (20) retaining attrition particles of the jointing faces (16, 17) in chambers (25, 26, 27) by the attrition particles needing to migrate from chamber to chamber through damming gaps (21, 22) and to be deflected for passage through the next gap in each case. Due to this tortuous arrangement the attrition particles remain totally within the chamber system of the labyrinth seal (20) and do not emerge from between the flanges (8, 9). When the seal (20) is provided between the seam (10) and the inner face (6) of a container, the interior thereof is thus protected from soilage due to attrition particles.

25 Claims, 1 Drawing Sheet

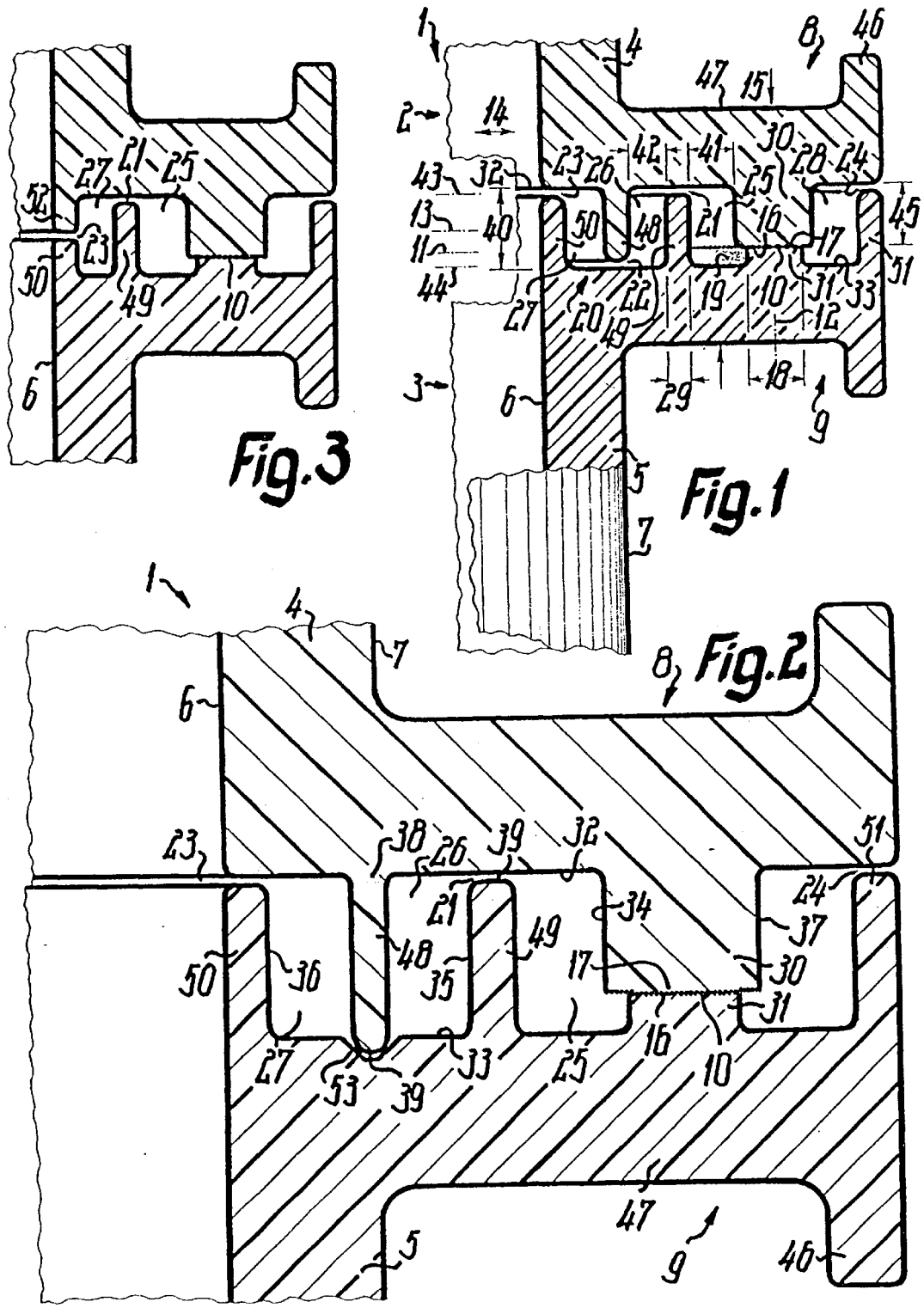

JOINTING UNIT FOR BONDING SEAMS, PARTICULARLY VIBRATION WELDS

TECHNICAL FIELD AND BACKGROUND OF THE INVENTION

The invention relates to a jointing unit for jointing seams, particularly seams supplying migratable material which may escape from between the opposed jointing zones or flange faces. Such material may be jointing material formed directly by the jointing flanges, i.e. solids such as particles capable of escaping laterally from between the jointing faces.

In the production of fusion or welded joints on components of plastics or the like the energy needed to melt the jointing material may be achieved by causing the jointing faces to be rubbed against each other by oscillation until they weld together. In this arrangement the jointing faces are rubbed together at a speed of 500 to 1000 mm per second for 2 to 8 secs at an oscillation frequency of 85 to 250 Hz and at an oscillation amplitude of 0.5 to 2 mm. The jointing faces are initially rubbed off by a depth of approx. 0.5 to 1 mm before then being melted off. Thereby the jointing faces are correspondingly approached toward each other.

Before the melting temperature is attained attrition particles are generated during the solid friction phase. These particles are required to remain between the flange faces. If the two components or dishes having annularly uninterrupted jointing flanges, flange faces or jointing faces are joined together by the seam to form a tank or container the cited attrition material must not gain access to the interior of the tank irrespective of how long the tank is in operation. Otherwise the contents of the tank would be soiled.

This applies especially to automotive fuel tanks whose communicating conduits from the tank to the combustion chamber would be choked up by such particles. Although the interior of the tank could be cleaned out after the joint has been made, this is, however, extremely complicated and hardly achievable with full success. Even in the case of a concealed seam there is no absolute guarantee that fine to very fine solids particles are not expelled from between the coverings of the flange faces and gain access to the large faces of the walls interconnected by their flanges.

OBJECTS OF THE INVENTION

An object is to provide a jointing unit which avoids the disadvantages of known configurations or of the aforementioned kind. Another object is to prevent on one or both outer sides of the sealing seam the escape of the cited material from between the flange faces. A still further object is, that the jointing flanges, particularly the flange faces, are simple in structure and handling.

SUMMARY OF THE INVENTION

According to the invention means are provided to prevent migration of most of the cited material or every material towards at least one side out of the jointing gap between the flange faces. Such means may comprise one or more chambers for receiving the material between the flange faces or at least one seal for preventing coming forth of the material.

This seal is preferably a labyrinth seal. The sealing members of the two flanges do not come into contact with each other or, at the most, without any significant pressing. They do not rub against each other to such an extent that attrition materializes. The narrowest gaps of the seal may be at least 0.2 or 0.4 mm. The associated gap planes are parallel to the jointing faces and thus to the direction of vibration. The flanks of the sealing members directly mutually opposed remain out of contact during the vibration or come into contact but with no significant pressure.

It is particularly expedient when the chamber directly adjoining the jointing faces is larger than the next chamber or the one more remote from the jointing faces which may adjoin the larger chamber via a sealing point. The width of the larger chamber as measured parallel to the vibration motion is sufficiently large so that the associated side faces remain spaced from each other even in closest approximation during vibration. Thus space remains for receiving the material even with the most constricted chamber. Accordingly, the material is not expelled from this chamber into the next chamber or only in negligable amounts. When a transfer of material into the next chamber occurs, it remains captured there just the same as in the larger chamber during all the time the welded item is in use.

Due to the sealing points the stored medium is unable to be flushed out of the side joint gaps of the seam. The retention or damming gap or all damming gaps is/are narrower than the jointing faces. In cross-section the jointing gap may form at each outside a narrow sealing gap. Between the sealing gap and the jointing faces at least two or three chambers and at least one or two sealing gaps are provided which are expediently displaced transversely to each other and/or to the jointing faces.

It is particularly expedient when the sealing gap is narrower than the narrowest jointing face or seam. The sealing gap can then be bounded by a web or a rib, the thickness of which is max. 2 or 1 mm. As a result the web may also pivot about its root and execute resilient tilt motions, e.g. give place to the material on a constriction of the chamber and thus adapt the minimum chamber size to the chamber contents without attrition generating at the web.

The chambers which are closed or open only in the vicinity of the sealing gaps are configured to be not symmetrical relative to the center plane. This plane of the jointing faces is perpendicular to the jointing faces. Particularly between the outside of the jointing gap to be protected from emission and the jointing faces more or larger chambers or more sealing gaps may be provided than at the other side.

BRIEF DESCRIPTION OF THE DRAWINGS

Example embodiments of the invention are explained in more detail in the following and illustrated in the drawings in which:

FIG. 1 is a cross-sectional view of the jointing unit according to the invention, FIG. 2 is a cross-sectional view of a further jointing unit illustrated greatly magnified, and FIG. 3 is a cross-sectional view of a further embodiment.

DETAILED DESCRIPTION

FIG. 1 illustrates the jointing unit 1 serving for non-detachably weld joining two tray-shaped components 2, 3 of thermoplastics material to a sealed tank by means of vibration welding. The energy required to melt off the plastics is generated by direct mutual friction of the bordering or jointing faces. On commencement of this oscillatory friction, namely in the solid friction phase, the jointing faces are still solid. This is followed by an initially instationary and then a stationary friction phase in which the jointing faces form a common film of plastics melt providing the jointing material. This is followed by the last phase, the cooling phase, in which the jointing material and thus the weld solidifies. Components 2, 3 form container walls 4, 5 of the container with inner faces 6 and outer faces 7. The inner faces 6 and the outer faces 7 respectively are flushingly aligned with each other.

Each component 2 or 3 comprises an annular flange 8 or 9 protruding only beyond the outer face 7 at the rim of the associated wall 4 or 5. The two flange s 8, 9 are connected to each other via a concealed welding or bonding seam 10 located in a seam plane 11 at right angles to walls 4, 5. The center plane 12 of the seam 10 is outwardly spaced from outer faces 7 and is radially spaced from face 7 more than from the outer circumference of flanges 8, 9. The center plane 13 between flanges 8, 9 which is perpendicular to the flange axes 3 and parallel to seam plane 11 is spaced from seam plane 11. The direction 14 of the welding vibration is parallel to planes 11, 13. During vibration, pressure is exerted on the one flange 8 at right angles to planes 11, 13 in direction 15. Thus flange 8 is pressed against the other flange 9 wich is counter supported.

During vibration and pressing action only the concealed jointing faces 16, 17 of flanges 8, 9 come into contact with each other. Faces 16, 17 are annular while in cross-section being located in the same center plane 12. Face 16 of flange 8 is 1 mm wider than face 17 of flange 9. The jointing zone of field 18, namely the overall extension of seam 10 is thus the same as that of face 17.

In the solid friction phase solid particles or jointing material 19 are abraded from faces 16, 17. The particles emerge laterally from between faces 16, 17 into the space between flanges 8, 9 and tend to be expelled up to inner face 6 during further vibration. To prevent this happening retention or barrier means 20, namely a labyrinth seal, are provided. Means 20 comprise between field 18 and inner face 6 three damming gaps 21, 22, 23 spaced from each other. A chamber 25 or 26 or 27 is bounded by flanges 8, 9 and between two gaps. The gaps and chambers are annular and are nested concentrically. The width of the gaps amounts to 0.3 mm and max. 1 or 0.5 mm. The breadth 29 of each gap is smaller than the breadth 41 or 42 of each chamber which in turn is smaller than the height extension 40 of each chamber.

Jointing face 16 is formed by a jointing web 30 and jointing face 17 by a jointing web 31, the height of which is less than that of jointing web 30, for example, 0.3 times the height 45 of jointing web 30. Jointing webs 30, 31 protrude beyond opposed faces of flanges 8, 9. These faces form the mutually opposed bottom faces 32, 33 of all chambers and their bottom planes are parallel to planes 11, 13. Faces 32, 33 also in each case form a bound of each gap. Between the outer circumference of flanges 8, 9 and the jointing field 18 likewise a damming gap 24 and a chamber 28 are provided. As compared to this side the number of gaps and chambers at the other side is more so that means 20 are configured asymmetrically to plane 12. Instead of a single gap 24 and a single chamber 28, however, a configuration may be provided on this side between face 6 and seam 10, which is the same as already described.

Each chamber is bounded by two webs protruding opposingly beyond faces 32, 33 and forming the chamber flanks 34 to 37. Each web adjoins the associated flange 8 or 9 in one part by a root 38. Each web is constant in thickness up to its free edge face 39 but may translate rounded into edge 39. In this case the edge 39 of each of the webs may form a planar surface or a totally convexely rounded face. Web edge 39 bounds with the opposite bottom 32 or 33 the associated gap. All gaps are the same in width.

Chamber 25 directly adjoining seam 10 is bounded by webs 30, 49. Next chamber 26 is bounded by webs 48, 49 and last chamber 27 is bounded by webs 48, 50. This chamber 27 directly adjoins face 6 via gap 23. Web 49 is located between webs 30, 48 and protrudes contrary thereto. Web 48 is located between webs 49, 50 and protrudes contrary thereto. Thus gaps 21, 23, 24 are located in a first gap plane 43 and a sole gap 22 in a second gap plane 44. Both gap planes 43, 44 are parallel to planes 11, 13 but located at their remote sides. Plane 43 is located at bottom 32 and plane 44 at bottom 33. Thus gaps 21, 23, 24 are more remote from plane 11 than gap 22. Both planes 43, 44 are equidistant from plane 13.

The jointing material 19 emerging from between faces 16, 17 needs to migrate from bottom 33 upwards over the full chamber height 40 into chamber 25 or 28 to gain access to next gap 21 or 24 respectively. When some of the material 19 is urged through gap 21, then this material needs to migrate downwards over the height 40 to gain access to next gap 22. Should some of the material 19 also gain access through this gap 22 it is deposited in chamber 27 before it could pass through gap 23. Where necessary, the number of gaps and chambers can be further increased. Although attrition particles can be deposited in all chambers, the arrangement is such that the last chamber 27 remains empty and thus the contents of the tank are unable to flush out the particles from the chambers. Each chamber forms an intercepting duct in which the particles can also be distributed longitudially throughout the chamber length.

The thickness 29 of all webs 48 to 51 is the same and not more or smaller than the width of field 18 or the thickness of webs 30, 31. Thereby the thickness 29 may amount to maximally 3 or 2 or 1.5 mm. This thickness equals the width of each gap. Flanks 34 to 36 of the webs are perpendicular to planes 11, 13. Thus each chamber is bounded by parallel and opposed chamber flanks. The spacing between the chamber flanks is given by the chamber breadth 41 or 42. The breadth 42 of chamber 26 or 27 equals the vibration path amounting to 1 or 2 mm. The breadth 41 of chamber 25 or 28 is larger relative to breadth 42 by half a millimeter. Thus chambers 25, 28 directly adjoining seam 10 are not totally closed during vibration. Even when chamber 25 or 28 is most constricted a residual volume remains free to receive all attrition particles without any significant densification. Chambers 26, 27 may be totally closed alternately during vibration by their flanks coming into mutual contact, but here too a residual volume can also remain free.

FIG. 2 illustrates how web 48 is able to also enter by its end or edge 39 a recess 53 in the associated chamber bottom 32 or 33 and to sealingly contact the bounds of this recess. This contact may be a positive abutting of edge 39 in direction 15 as aparent from FIG. 2 or it may be a contact of the web flanks with the flanks of the recess permitting mutual sliding motion parallel to direction 15. Since on vibration flanges 8, 9 are approximated at faces 16, 17 corresponding to formation of the melt, edge 39 in the first case comes into contact with recess 53 not before the end of vibration whereas in the second case already at the beginning of vibration web 48 may sealingly engage the recess, for example, a groove.

To nevertheless permit vibrational motion the web root 38 acts as a bending hinge about which those longitudinal sections of web 48 which are oriented transverse to direction 14 pivot oscillatingly. The longitudinal sections oriented parallel to direction 14 execute no such pivotal motions. The chambers bounded by these longitudinal sections are also not constricted or widened. In any case the connection between web 48 and recess 53 is selected so that no attrition occurs due to the relative motions. Each of the other webs 49 to 51 like web 48 is able to engage the opposing flange.

Adjoining the outer circumference, each flange 8 or 9 comprises a reinforcement web or member 46, for example, a rib spaced from wall 4 and 5 respectively and protruding beyond the flange side facing away from seam 10. With the outer face 7 the annular web 46 bounds a groove 47. The bottom of groove 47 is parallel to planes 11, 13 and serves to receive the compressive force in direction 15 or the opposingly oriented counter force. In groove 47 the corresponding tool of the vibration welding machine can be reliably received without contacting wall 4 or 5.

FIG. 3 illustrates how only two chambers 25, 27 and a single gap 21 are provided between seam 10 and gap 23 whilst three chambers and two gaps are provided in FIGS. 1 and 2. Gap 23 is transversely offset from plane 43 of gap 21 and is located in the middle of chamber height 40, i.e. in plane 13. For this purpose none of the bounds of gap 23 is formed by one of bottom faces 32, 33. Instead both bounds are formed by webs 50, 52, each of which protrudes beyond the associated bottom face 32 or 33 and is equal in height. Both webs 50, 52 form inner face 6.

The method in accordance with the invention prevents by simple ways and means attrition particles or other material from emerging between the flange faces at the one or other side of wall 4, 5. Prior to welding, components 2, 3 are cleaned of particles before being layed separately into the tools of the welding machine by which they are then put together so that only faces 16, 17 come into mutual contact. Since webs 30, 31 are still higher at first, gaps 21 to 24 have their greatest width. Vibration is then applied, resulting in the faces 16, 17 being rubbed against each other and heated up due to friction until the melting temperature of the plastics material is attained. Due to the pressure the webs 30, 31 are reduced in height until the desired gap width is attained. Once seam 10 has cooled down unit 1 is removed from the tools.

It is understood that all features of each embodiment may be provided in any other embodiment. Also, each damming gap, each chamber or each web may be configured like any of the other corresponding arrangements. The features and effects or dimensions may be provided precisely or merely substantially or roughly as described and may also greatly deviate therefrom, depending on the requirements.

What is claimed is:

1. A jointing unit for a bonding seam formed by vibration welding comprising:
    jointing flanges comprising opposed flange faces, said flange faces including jointing faces to be interfixed in a jointing field by jointing material, activated by vibrating the jointing faces against each other:
        at least two chambers bounded by said flange faces adjacent to said jointing faces, said at least two chambers situated side-by-side at one side of said jointing faces and including a first chamber proximate to the jointing faces and a second chamber farther from the jointing faces, said first chamber receiving excess jointing material emerging from between said jointing faces;
        wherein barrier means are included between said at least two chambers for impeding said excess jointing material from passing toward said second chamber such that said second chamber remains substantially empty; and
    a jointing web including one of said jointing faces, wherein said jointing web is flanked by first and second webs and is at least half to two-thirds as high as each of said first and second webs.

2. The jointing unit according to claim 1, wherein said barrier means include at least one damming gap.

3. The jointing unit according to claim 2, wherein said at least one damming gap is smaller than said jointing field.

4. The jointing unit according to claim 1, and further defining bottom planes of said at least two chambers, barrier means include at least two damming gaps, wherein at least one of said damming gaps is located between said bottom planes, at least one of said jointing flanges connecting to a container wall defining an inside face and an outside face remote from said inside face, at least one of said damming gaps connecting to at least one of said inside and outside faces.

5. A jointing unit for a bonding seam formed by vibration welding comprising:
    jointing flanges comprising opposed flange faces, said flange faces including jointing faces to be interfixed in a jointing field by jointing material, activated by vibrating the jointing faces against each other; and
    at least two chambers bounded by said flange faces adjacent to said jointing faces, said at least two chambers situated side-by-side at one side of said jointing faces and including a first chamber proximate to the jointing faces and a second chamber farther from the jointing faces, said first chamber receiving excess jointing material emerging from between said jointing faces;
    wherein barrier means are included between said at least two chambers for impeding said excess jointing material from passing toward said second chamber such that said second chamber remains substantially empty:
        wherein said barrier means include at least two damming gaps including a first damming gap and a second damming gap, said first damming gap defining a first gap plane and said second damming gap defining a second gap plane displaced relative to said first gap plane.

6. The jointing unit according to claim 5, wherein said first damming cap includes two individual gaps located on a common side laterally connecting to said jointing field.

7. A jointing unit for a bonding seem formed by vibration welding comprising:
    jointing flanges comprising opposed flange faces, said flange faces including jointing faces to be interfixed in a jointing field by jointing material, activated by vibrating the jointing faces against each other; and
    at least two chambers bounded by said flange faces adjacent to said jointing faces, said at least two chambers situated side-by-side at one side of said jointing faces and including a first chamber proximate to the jointing faces and a second chamber farther from the jointing faces, said first chamber receiving excess jointing material emerging from between said jointing faces;
    wherein barrier means are included between said at least two chambers for impeding said excess jointing material from passing toward said second chamber such that said second chamber remains substantially empty;
    wherein a first side laterally connecting to said jointing field is defined; and wherein said barrier means includes at least two damming gaps located on said first side of said jointing field.

8. The jointing unit according to claim 7, wherein at least one of said damming gaps is located between said at least two chambers.

9. The jointing unit according to claim 7, wherein said barrier means are spaced from said jointing field.

10. The jointing unit according to claim 7, wherein said second chamber is smaller than said first chamber.

11. The jointing unit according to claim 7, wherein said at least two chambers include a plurality of chambers, and wherein all chambers of said plurality of chambers have a substantially common height extension measured transverse to said jointing field.

12. The jointing unit according to claim 7, wherein said at least two chambers and said barrier means are volumetrically variable by slidingly abrading said jointing faces.

13. The jointing unit according to claim 7, wherein said first chamber directly adjoins said jointing field and said second chamber is more remote from said jointing field than said first chamber, and wherein, in a cross-section, said first chamber is wider than said second chamber.

14. The jointing unit according to claim 7, wherein at least one of said damming gaps is narrower than at least one of said at least two chambers, and said jointing field.

15. The jointing unit according to claim 7, wherein said damming gaps are located in gap planes displaced relative to said jointing field.

16. The jointing unit according to claim 7, wherein said jointing field is located between said at least two chambers and a further chamber.

17. The jointing unit according to claim 16 and further defining a first side of said jointing field and a second side remote from said first side, wherein said chambers include a first number of individual chambers located at said first side, said chambers including a second number of individual chambers located at said second side, said first number being different from said second number.

18. The jointing unit according to claim 7, wherein said barrier means include a labyrinth seal.

19. The joining unit according to claim 7, and further including a web defining a web height and a web thickness, wherein said web bounds said at least one chamber, said web height being at least 1.5 to three times said web thickness.

20. The jointing unit according to claim 19, wherein said web thickness is substantially constant over most of said web height.

21. The jointing unit according to claim 7, and further including at least three webs including a first web, a second web and a third web, wherein said at least three webs alternately project in opposing directions, said at least three webs being separate from said jointing faces.

22. The jointing unit according to claim 7, wherein said flange faces include opposed bottom faces bounding said at least two chambers commonly with flank faces, at least one of said bottom faces being substantially planar and freely exposed inside said jointing unit.

23. The jointing unit according to claim 7, wherein at least one of said damming gaps is bounded by two opposed webs when said jointing faces are interfixed.

24. The jointing unit according to claim 7, and further defining a flange side remote from said flange faces, wherein at least one of said jointing flanges includes a reinforcement member freely protruding at said flange side.

25. The jointing unit according to claim 24 and further including a depression with a depression bottom, wherein said depression is bilaterally flanked, said reinforcement member flanking said depression.

\* \* \* \* \*